US008562328B2

(12) United States Patent
Trost

(10) Patent No.: US 8,562,328 B2
(45) Date of Patent: Oct. 22, 2013

(54) METHOD AND APPARATUS FOR PRODUCING FIGURED VENEER

(75) Inventor: Juergen F. Trost, Reutlingen (DE)

(73) Assignee: Padana AG, Baar (CH)

( * ) Notice: Subject to any disclaimer, the term of this patent is extended or adjusted under 35 U.S.C. 154(b) by 277 days.

(21) Appl. No.: 12/741,538

(22) PCT Filed: Nov. 10, 2008

(86) PCT No.: PCT/US2008/082955

§ 371 (c)(1),
(2), (4) Date: May 5, 2010

(87) PCT Pub. No.: WO2009/067344

PCT Pub. Date: May 28, 2009

(65) Prior Publication Data

US 2010/0244319 A1 Sep. 30, 2010

Related U.S. Application Data

(60) Provisional application No. 61/988,846, filed on Nov. 19, 2007.

(51) Int. Cl.
*B29C 59/04* (2006.01)

(52) U.S. Cl.
USPC ............................ 425/220; 425/233; 425/374

(58) Field of Classification Search
USPC .......................................... 425/220, 233, 374
See application file for complete search history.

(56) References Cited

U.S. PATENT DOCUMENTS

| | | | |
|---|---|---|---|
| 14,472 | A | 3/1856 | Schwickardt |
| 55,604 | A | 6/1866 | Beckers |

(Continued)

FOREIGN PATENT DOCUMENTS

| | | | | |
|---|---|---|---|---|
| GB | 1230817 A * | 5/1971 | .............. | B29D 7/00 |
| JP | 64-55202 | 3/1989 | | |
| JP | 08-332603 | 12/1996 | | |

OTHER PUBLICATIONS

International Preliminary Report on Patentability for PCT International Application No. PCT/US2008/082955 issued May 25, 2010.

(Continued)

*Primary Examiner* — James Sanders
(74) *Attorney, Agent, or Firm* — Barnes & Thornburg LLP

(57) ABSTRACT

A method and apparatus for making a piece of figured veneer comprise means for, and the steps of, softening lignin in a sheet of veneer, pressing the sheet of veneer between complementary corrugating press rollers having a pitch and a depth to press the sheet of veneer into a wavy or corrugated configuration, and surfacing the pressed sheet of veneer to remove crests of the corrugations, making the piece of figured veneer. Another method and apparatus for making a piece of figured veneer, comprise means for, and the steps of, softening lignin in a sheet of veneer, placing the sheet of veneer onto a wavy or corrugated surface of a plate, pressing the sheet of veneer using a press roller so that the roller presses the sheet of veneer against the surface to achieve a wavy or corrugated veneer, and surfacing the pressed sheet of veneer to remove peaks of the corrugations, making the piece of figured veneer. Yet another method and apparatus for making a piece of figured veneer, comprise means for, and the steps of, softening lignin in a sheet of veneer, placing the sheet of veneer onto a corrugated surface of a plate having such a wavy or corrugated surface, pressing the sheet of veneer onto the troughs and peaks of the surface using a flexible platen having a corrugated surface so that the corrugated surface of the platen presses the sheet of veneer against the corrugated surface of the plate to achieve a wavy or corrugated veneer, and surfacing the pressed sheet of veneer to remove peaks of the corrugations, making the piece of figured veneer.

5 Claims, 5 Drawing Sheets

(56) References Cited

U.S. PATENT DOCUMENTS

| | | | |
|---|---|---|---|
| 2,017,037 | A | 10/1935 | Brown |
| 4,388,133 | A | 6/1983 | Hirao et al. |
| 4,554,959 | A | 11/1985 | Smedberg |
| 4,865,912 | A | 9/1989 | Mitsumata |
| 6,139,965 | A | 10/2000 | Murai |
| 6,298,888 | B1 | 10/2001 | Murai |
| 6,481,476 | B1 | 11/2002 | Okamoto |
| 7,108,031 | B1 | 9/2006 | Secrest |

OTHER PUBLICATIONS

International Search Report and Wirtten Opinion for PCT/US2008/082955 completed May 22, 2009.

"Inside-Out Carving", Popular Science, May, 1961, pp. 170-171.

* cited by examiner

METHOD AND APPARATUS FOR PRODUCING FIGURED VENEER

CROSS REFERENCE TO RELATED APPLICATIONS

This application is the U.S. national phase of PCT/US2008/082955 filed Nov. 10, 2008. PCT/US2008/082955 claims the benefit under 35 U.S.C. §119(e) of U.S.S.N. 60/988,846 filed Nov. 19, 2007. The complete disclosures of U.S.S.N. 60/988,846 and PCT/US2008/082955 are hereby incorporated herein by reference.

FIELD OF THE INVENTION

This invention relates to methods and apparatus for producing wood products. It is disclosed in the context of methods and apparatus for producing figured wood veneers, but is believed to have other applications as well.

BACKGROUND OF THE INVENTION

Method and apparatus for producing figured wood veneer and other figured wood products are known. There are, for example, the methods and apparatus illustrated and described in U.S. Pat. Nos. 7,108,031; 6,481,476; 6,298,888; 6,139,965; and, 4,865,912. The disclosures of all of these references are hereby incorporated herein by reference. This listing is not intended to be a representation that a complete search of all relevant art has been made, or that no more pertinent art than that listed exists, or that the listed art is material to patentability. Nor should any such representation be inferred.

DISCLOSURE OF THE INVENTION

According to an aspect of the invention, a method for making a piece of figured veneer comprises softening lignin in a sheet of veneer, then pressing the sheet of veneer between complementary corrugating press rollers having a pitch and a depth to press the sheet of veneer into a wavy or corrugated configuration, and surfacing the pressed sheet of veneer to remove crests of the corrugations, making the piece of figured veneer.

According to another aspect of the invention, a method for making a piece of figured veneer comprises softening lignin in a sheet of veneer, placing the sheet of veneer onto a wavy or corrugated surface of a plate having such a wavy or corrugated surface, pressing the sheet of veneer onto the troughs and peaks of the surface using a press roller so that the roller presses the sheet of veneer against the surface to achieve a wavy or corrugated veneer, and surfacing the pressed sheet of veneer to remove peaks of the corrugations, making the piece of figured veneer.

According to yet another aspect of the invention, a method for making a piece of figured veneer comprises softening lignin in a sheet of veneer, placing the sheet of veneer onto a corrugated surface of a plate having such a wavy or corrugated surface, pressing the sheet of veneer onto the troughs and peaks of the surface using a flexible platen having a corrugated surface so that the corrugated surface of the platen presses the sheet of veneer against the corrugated surface of the plate to achieve a wavy or corrugated veneer, and surfacing the pressed sheet of veneer to remove peaks of the corrugations, making the piece of figured veneer.

Illustratively according to these aspects of the invention, softening the lignin in the sheet of veneer comprises heating the sheet of veneer.

Illustratively according to these aspects of the invention, heating the sheet of veneer comprises steaming the sheet of veneer in a steamer.

Further illustratively according to these aspects of the invention, the method comprises drying the sheet of veneer without relieving the corrugations.

Illustratively according to these aspect of the invention, drying the sheet of veneer comprises passing the sheet of veneer through a veneer drying oven.

Illustratively according to these aspects of the invention, surfacing the pressed sheet of veneer comprises sanding the sheet of veneer.

Illustratively according to these aspects of the invention, surfacing the pressed sheet of veneer comprises removing peaks or crests of the corrugations.

According to another aspect of the invention, an apparatus for making a piece of figured veneer comprises a heating device for softening lignin in a sheet of veneer and complementary corrugating press rollers for pressing the sheet of veneer between the complementary corrugating press rollers. The complementary corrugating press rollers have a pitch and a depth to press the sheet of veneer into a wavy or corrugated configuration. The apparatus further comprises a surfacing device for surfacing the pressed sheet of veneer to remove crests of the corrugations, making the piece of figured veneer.

Illustratively according to this aspect of the invention, the heating device comprises a steamer.

Further illustratively according to this aspect of the invention, the apparatus comprises a veneer drying oven for drying the sheet of veneer without relieving the corrugations.

Illustratively according to this aspect of the invention, the surfacing device comprises a sanding device.

Illustratively according to this aspect of the invention, the surfacing device comprises a device for removing crests of the corrugations.

According to another aspect of the invention, an apparatus for making a piece of figured veneer comprises a heating device for softening lignin in a sheet of veneer, a plate having a wavy or corrugated surface, a press roller for pressing the sheet of veneer onto the troughs and peaks of the surface so that the roller presses the sheet of veneer against the surface to achieve a wavy or corrugated veneer, and a surfacing device for surfacing the pressed sheet of veneer to remove peaks of the corrugations, making the piece of figured veneer.

Illustratively according to this aspect of the invention, the heating device comprises a steaming device.

Further illustratively according to this aspect of the invention, the apparatus comprises a device for drying the sheet of veneer without relieving the corrugations.

Illustratively according to this aspect of the invention, the device for drying the sheet of veneer without relieving the corrugations comprises a veneer drying oven.

Illustratively according to this aspect of the invention, the surfacing device comprises a sanding device.

Illustratively according to this aspect of the invention, the surfacing device comprises a device for removing peaks of the corrugations.

According to yet another aspect of the invention, an apparatus for making a piece of figured veneer comprises a heating device for softening lignin in a sheet of veneer, a plate having an upwardly facing corrugated surface, a flexible platen having a downwardly facing corrugated surface, a press roller for pressing the downwardly facing corrugated surface of the platen against the sheet of veneer onto the troughs and peaks of the upwardly facing corrugated surface of the plate so that the platen and plate presses the sheet of veneer into a sheet of corrugated veneer, and a surfacing device for surfacing the pressed sheet of veneer to remove peaks of the corrugations, making the piece of figured veneer.

Illustratively according to this aspect of the invention, the heating device comprises a steaming device.

Further illustratively according to this aspect of the invention, the apparatus comprises a device for drying the sheet of veneer without relieving the corrugations.

Illustratively according to this aspect of the invention, the device for drying the sheet of veneer without relieving the corrugations comprises a veneer drying oven.

Illustratively according to this aspect of the invention, the surfacing device comprises a sanding device.

Illustratively according to this aspect of the invention, the surfacing device comprises a device for removing peaks of the corrugations.

BRIEF DESCRIPTIONS OF THE DRAWINGS

The invention may best be understood by referring to the following detailed description and accompanying drawings which illustrate the invention. In the drawings.

Figure 1:
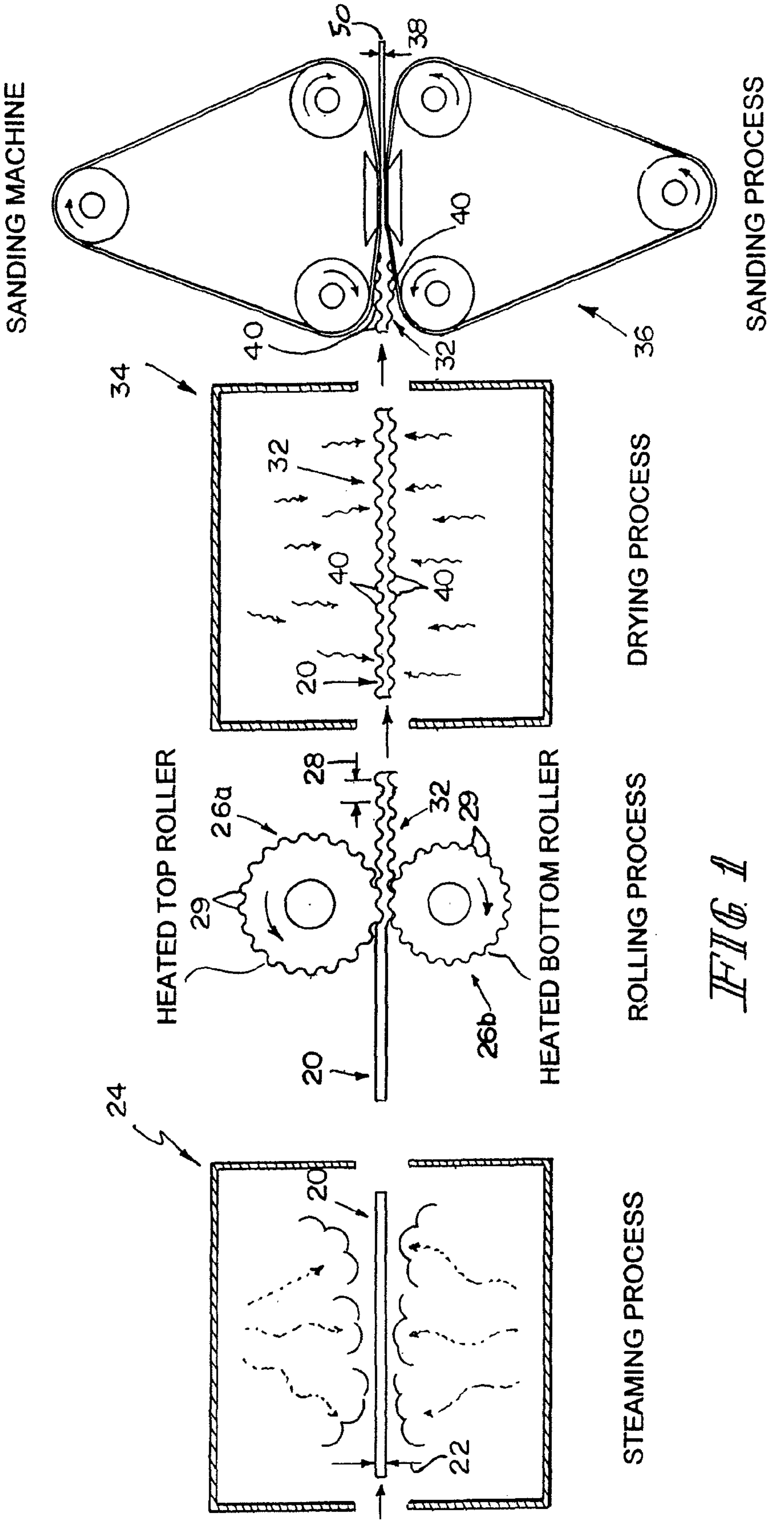
FIG. 1 illustrates a method of making figured veneer.
Figure 2:
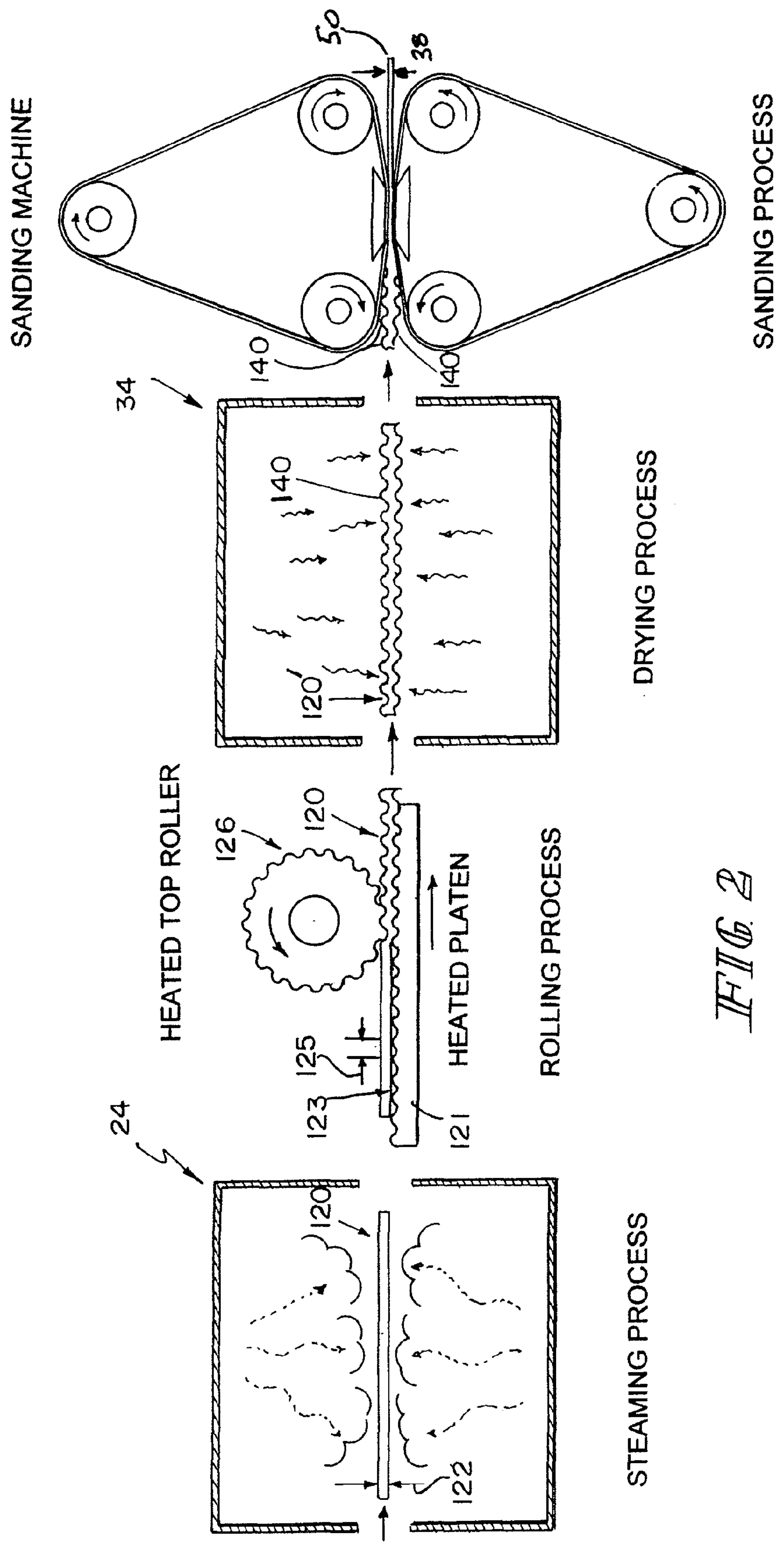
FIG. 2 illustrates another method of making figured veneer.
Figure 3A:
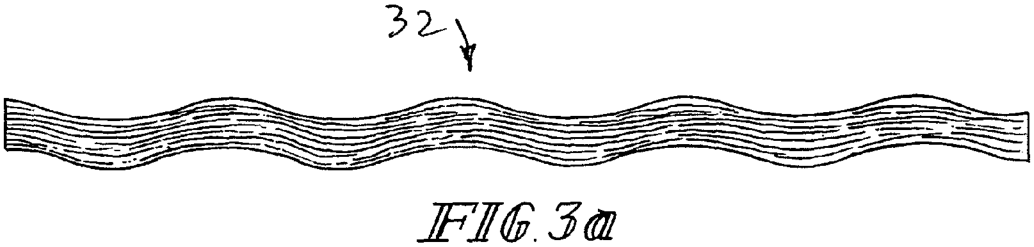
Figure 3B:
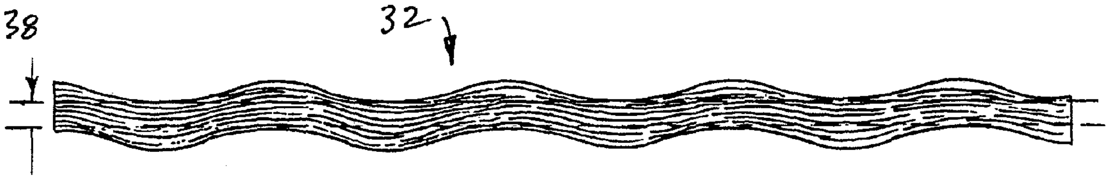
Figure 3C:
Figure 3D:
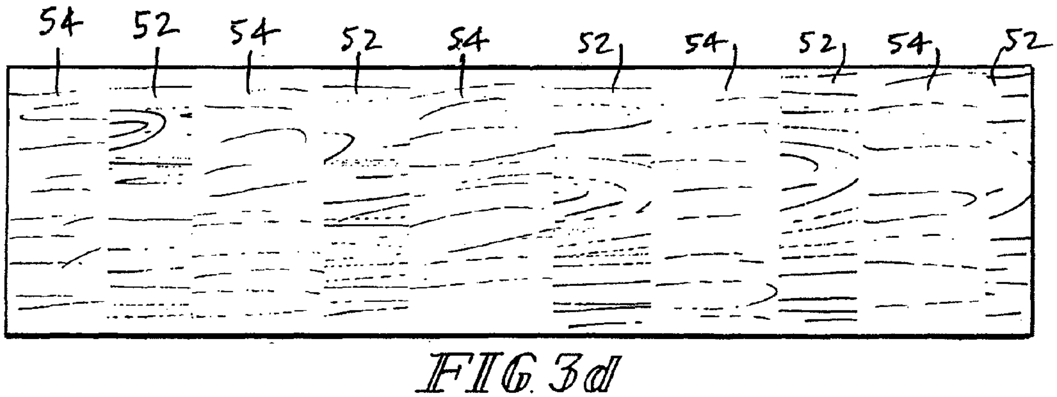
Figure 4:
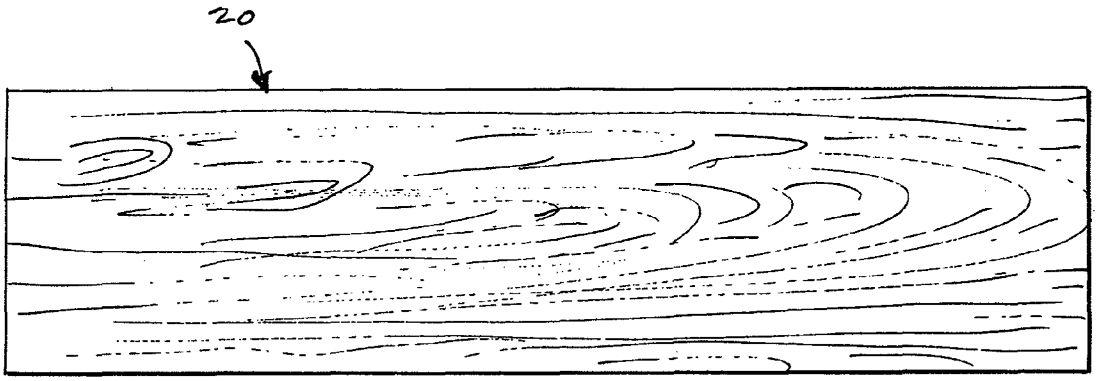
Figure 5:
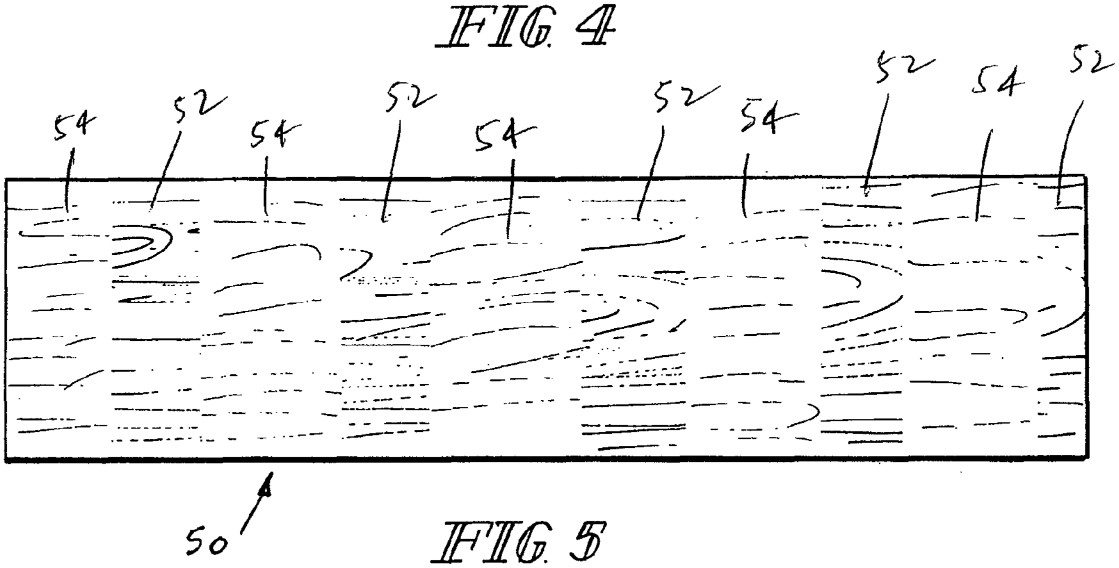
Figure 6:
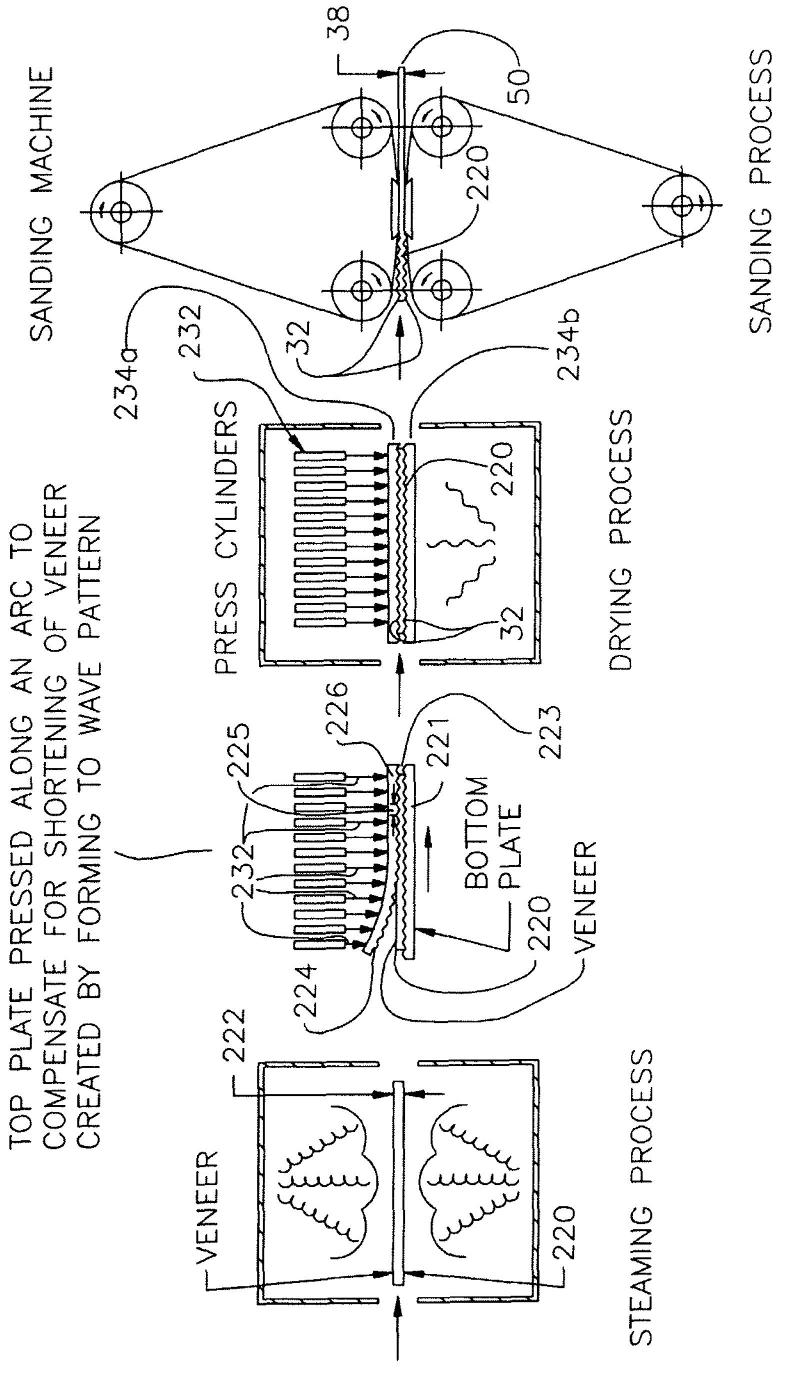

FIG. 3*a* illustrates a side view of a sheet of veneer which has been partially processed through the rolling process of FIG. 1;

FIG. 3*b* illustrates the sheet of veneer of FIG. 3*a* with processing lines superimposed on the sheet illustrating the material to be removed in the sanding process of FIG. 1;

FIG. 3*c* illustrates a side view of the sheet of veneer illustrated in FIGS. 3*a* and 3*b* after the sheet has been processed through the sanding process of FIG. 1 or FIG. 2;

FIG. 3*d* illustrates a plan view of the sheet illustrated in FIG. 3*c*;

FIG. 4 illustrates a plan view of an unprocessed sheet of veneer;

FIG. 5 illustrates a plan view of the sheet illustrated in FIG. 4 after processing through the processes of FIG. 1 or FIG. 2; and FIG. 6 illustrates another method of making figured veneer.

DETAILED DESCRIPTIONS OF ILLUSTRATIVE EMBODIMENTS

A process for producing a piece of figured veneer 50 illustrated in FIGS. 3*d* and 5 comprises softening lignin in a sheet 20 of veneer illustrated in FIG. 4, then pressing the sheet 20 of veneer between complementary members each having a pitch and a depth to press the sheet of veneer into a wavy or corrugated configuration illustrated in FIGS. 1, 2, 3*a* and 3*b*, and surfacing the wavy sheet of veneer to remove crests of the corrugations to form a sheet of uniform thickness 38 as illustrated in FIG. 3*c*, producing the piece of figured veneer 50 illustrated in FIG. 5.

Referring now to FIG. 1, one illustrated process proceeds as follows. Veneer 20 having a thickness 22 in the range of about 1.2 to about 1.5 mm is heated, for example, by steaming it in a batch process or continuous process steamer 24, to soften the lignin in the veneer 20. The thus-heated veneer 20 is then pressed between two complementary corrugating press rollers 26*a*, 26*b* having any desired pitch 28 (illustratively about 5 cm to about 10cm), depending, among other things, on the size of the article to be constructed using the veneer 20, between crests 29 of the rollers and a depth in the range of about 0.25 to about 0.75 mm to press the sheets of veneer 20 into a wavy or corrugated configuration 32. The veneer 20 is then dried, for example, in a veneer drying oven 34, without relieving the corrugations. Then, the dried veneer 20 is surfaced, for example, sanded using a sander 36, to a veneer thickness 38 in the range of about 0.25 to about 0.75 mm. Through this surfacing process crests 40 of the corrugations are removed, cutting through the grain. The overall appearance of the thus-processed figured veneer 50 changes. The reflection of light change between adjacent interleaved areas 52, 54 in the figured veneer 50 creates the figured effect illustrated in FIG. 5.

Another process for producing a piece of figured veneer 50 comprises softening lignin in a sheet 20 of veneer, placing the sheet 20 of veneer onto a wavy or corrugated surface of a plate having such a wavy or corrugated surface, pressing the sheet 20 of veneer onto the troughs and peaks of the surface using a press roller so that the roller presses the sheet of veneer against the surface to achieve a wavy or corrugated configuration as illustrated in FIGS. 3*a* and 3*b*, and surfacing the pressed sheet of veneer to remove peaks of the corrugations as illustrated in FIG. 3*c*, producing the piece of figured veneer 50 illustrated in FIGS. 3*d* and 5.

Referring now to FIG. 2, this process proceeds as follows. Veneer 120 having a thickness 122 in the range of about 1.2 to about 1.5 mm is heated to soften the lignin in the veneer 120. The thus-heated veneer 120 is then laid on a plate 121 having a wavy or corrugated surface 123. A press roller 126 having substantially the same pitch 125 as the corrugations of surface 123 is then run along the troughs and peaks of the corrugations of surface 123 so that the roller 126 presses the softened veneer 120 against the plate 121 to achieve a wavy or corrugated veneer 120' as in the first embodiment of the process. The veneer 120' is then dried without relieving the corrugations and surfaced to a veneer thickness 38 of in the range of about 0.25 to about 0.75 mm. Through this surfacing process, crests 140 of the corrugations are removed, cutting through the grain. The overall appearance of the thus-processed figured veneer 50 and its reflection of light change as described above.

In yet another embodiment of the process illustrated in FIG. 6, a sheet of veneer 220 having a thickness 222 with softened lignin is laid on a plate 221 having a wavy or corrugated surface 223. A flexible platen 226 having a wavy or corrugated surface 224 having substantially the same pitch 225 as the corrugations of surface 223 is then engaged with the sheet of veneer 220. A load 232 (illustratively provided by individually controlled pneumatic or hydraulic cylinders) is applied along the flexible platen such that the troughs and peaks of the corrugations of surface 224 press the softened veneer 220 against the plate 221 to achieve a wavy or corrugated configuration 32 of veneer 220 as in the preceding embodiments. The flexible platen 226 presses veneer 220 into corrugated surface as the pressing force 232 advances from one end to the other to prevent stresses along the grain of veneer 220 as its length is shortened as the corrugations are formed. The veneer 220 is then held in pressed shape, illustratively between two plates 234*a* and 234*b*, and allowed to dry without relieving the corrugations and surfaced (again, for example, by sanding) to a veneer 50, FIGS. 3*c*, 3*d* and 5, having a thickness 38 of in the range of about 0.25 to about 0.75 mm. The overall appearance of the thus-processed figured veneer 50 and its reflection of light change as described above.

The inventive process does not compress the fibers of the veneer 20, 120, 220 during surfacing. As a result, the starting thickness 22, 122, 222 of the veneer 20, 120, 220 does not need to be as great (about 2 mm or more) as required by the prior art to generate the wavy or figured pattern. There is thus less waste produced by the inventive process. Veneer produced by the inventive process is believed to be much smoother and have a higher surface quality than figured veneer produced by prior art processes. Additionally, the described processes can be performed on either green (wet) or dry veneer with good results.

What is claimed is:

1. Apparatus for making a piece of figured wood veneer, the apparatus comprising a heating device for softening lignin in a sheet of wood veneer, a plate having an upwardly facing corrugated surface, a flexible platen having a downwardly facing corrugated surface, a press roller for pressing the downwardly facing corrugated surface of the platen against the sheet of wood veneer onto the troughs and peaks of the upwardly facing corrugated surface of the plate so that the platen and plate presses the sheet of wood veneer into a corrugated sheet of wood veneer, and a surfacing device for surfacing the corrugated sheet of wood veneer to remove peaks of the corrugations, making the piece of figured wood veneer.

2. The apparatus of claim 1 wherein the heating device comprises a steaming device.

3. The apparatus of claim 1 further comprising a device for drying the corrugated sheet of wood veneer without relieving the corrugations.

4. The apparatus of claim 3 wherein the device for drying the corrugated sheet of wood veneer without relieving the corrugations comprises a wood veneer drying oven.

5. The apparatus of claim 3 wherein the surfacing device comprises a sanding device.

* * * * *